United States Patent [19]

Mensick

[11] Patent Number: 5,971,636
[45] Date of Patent: *Oct. 26, 1999

[54] ERGONOMICALLY IMPROVED STANDARD KEYBOARD

[76] Inventor: John Mensick, 4743 McHenry Gate Way, Pleasanton, Calif. 94566

[ * ] Notice: This patent is subject to a terminal disclaimer.

[21] Appl. No.: 08/993,394

[22] Filed: Dec. 18, 1997

Related U.S. Application Data

[63] Continuation-in-part of application No. 08/047,633, Apr. 13, 1993, Pat. No. 5,716,149, which is a continuation of application No. 07/780,935, Oct. 23, 1991, abandoned.

[51] Int. Cl.$^6$ .................................................. B41J 5/10
[52] U.S. Cl. .......................................... 400/489; 400/486
[58] Field of Search .................................... 400/489, 488, 400/486

[56] References Cited

U.S. PATENT DOCUMENTS

| | | | |
|---|---|---|---|
| 4,244,659 | 1/1981 | Malt | 400/489 |
| 4,579,470 | 4/1986 | Casey | 400/491.3 |

OTHER PUBLICATIONS

Conway, "Degital X" Typewriter Keyboard, IBM Technical Disclosure Bulletin, vol. 18, No. 12, May 1976.

*Primary Examiner*—Edgar Burr
*Assistant Examiner*—Anthony H. Nguyen
*Attorney, Agent, or Firm*—Baker & McKenzie

[57] ABSTRACT

A keyboard is described which integrates ergonomic modification while taking into consideration the psychological resistance to changing existing, familiar designs. Accordingly, the geometric relationships between keys is selected such that there is a correspondence drawn between the relative positions of the base of the fingers (i.e., where the fingers meet the hand), the wrist, and the natural orientation of the fingertips. This correspondence correlates the organization of keys with the arrangements of the metacarpophalangeal joints forming the base of the fingers. This is supported by a theory concerning the way the human brain may track the positions of the fingers and hands. As well, the creation of logical groups are detailed which allow more ergonomic adjustment of the keys, yet preserve the existing geometry of an original keyboard. In particular, these ergonomic modifications are applied to the standard geometry of the "Qwerty" or "Dvorak" keyboard.

10 Claims, 9 Drawing Sheets

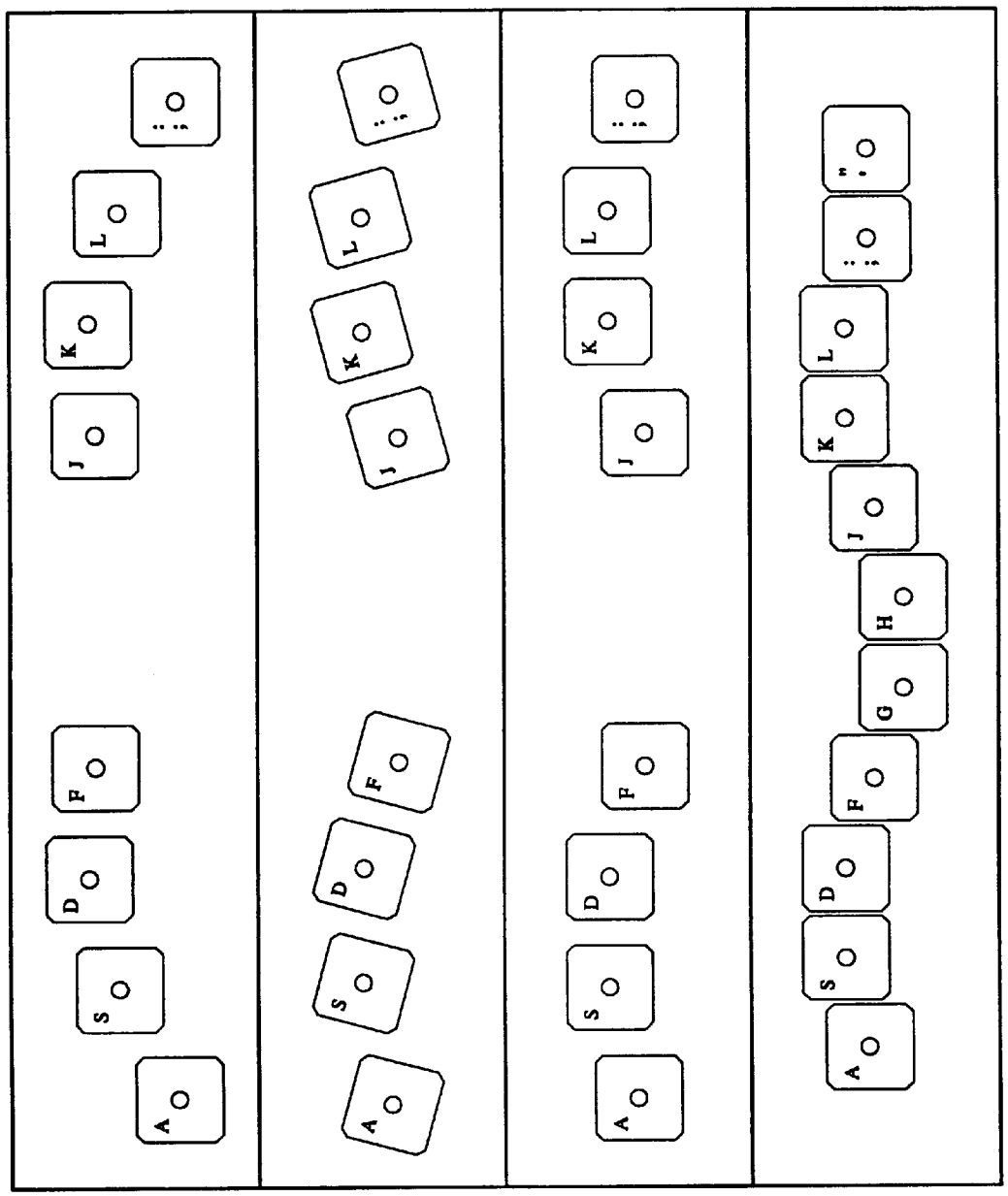
Fig. 5A -
Fig. 5B -
Fig. 5C -
Fig. 5D -

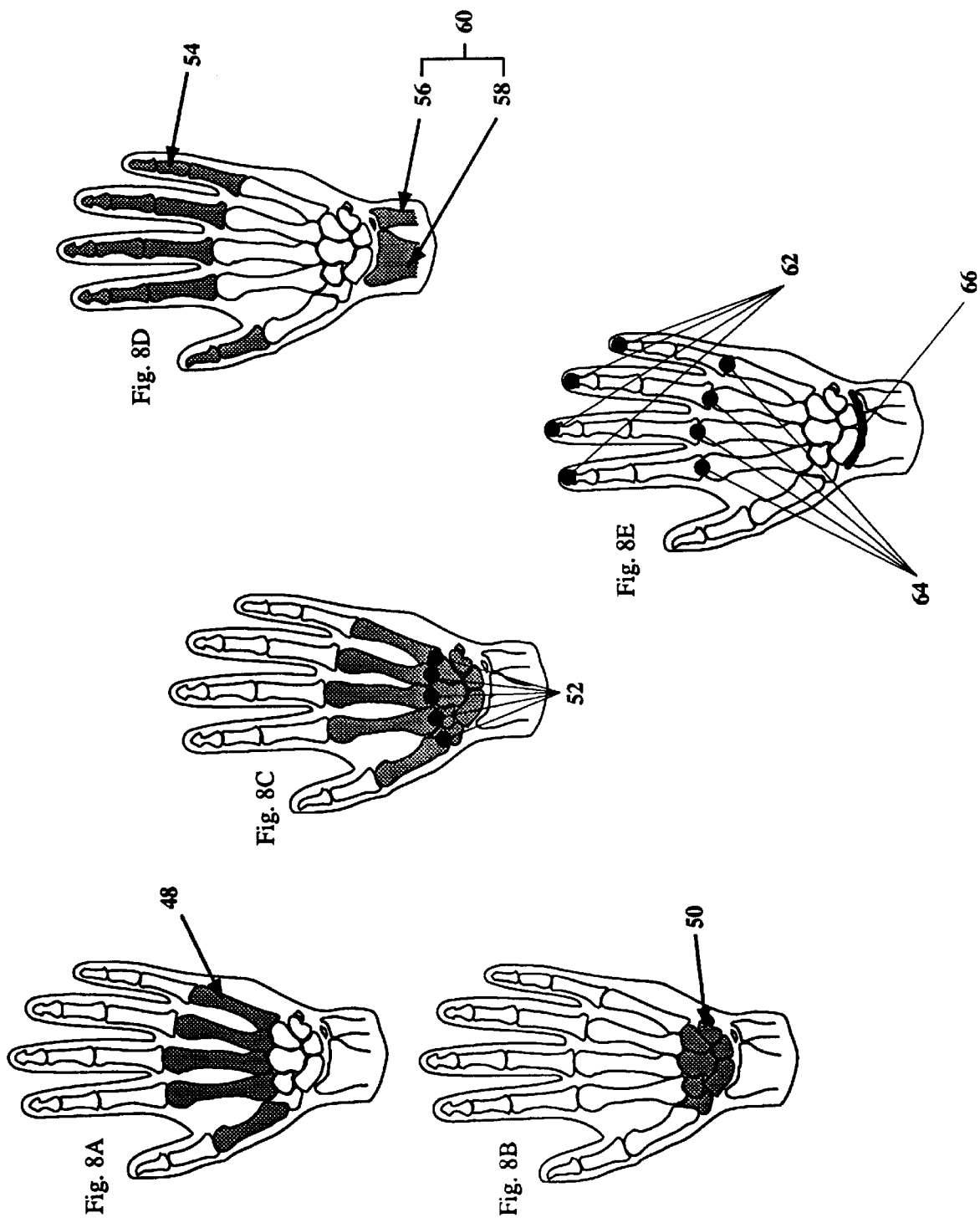

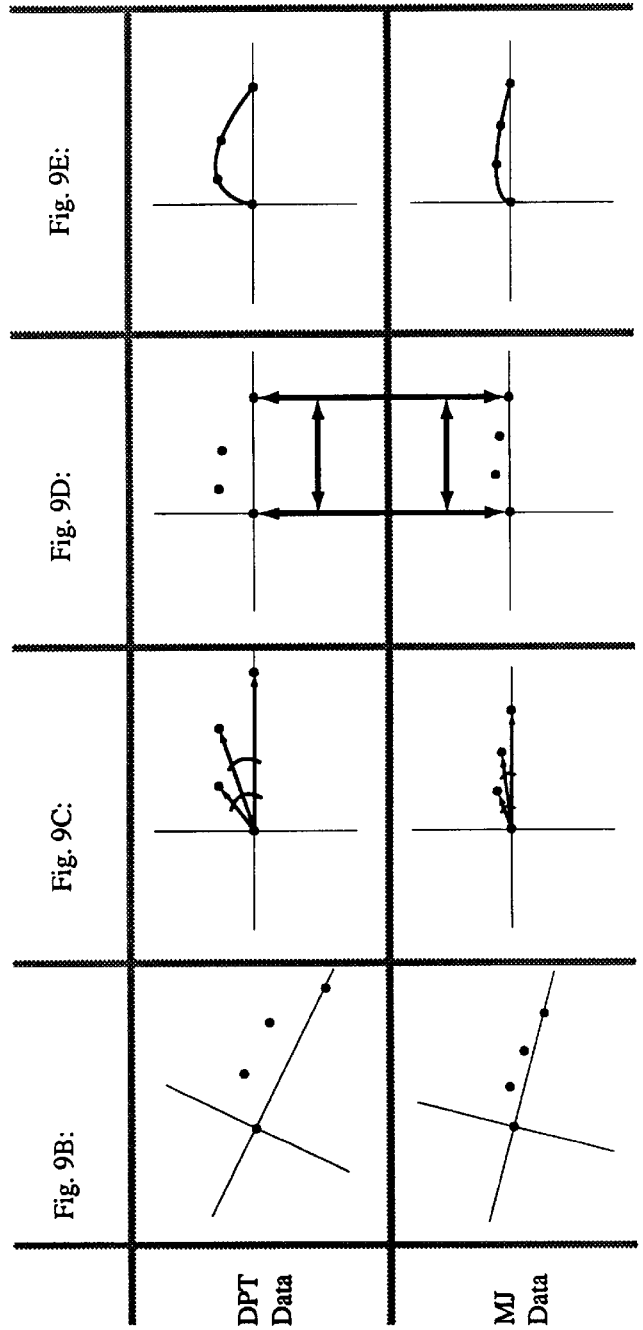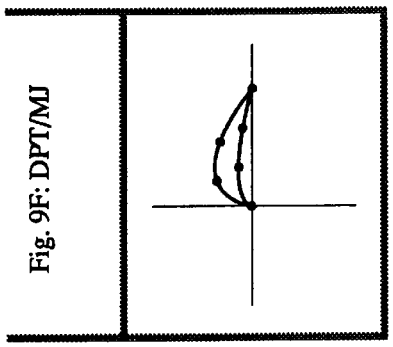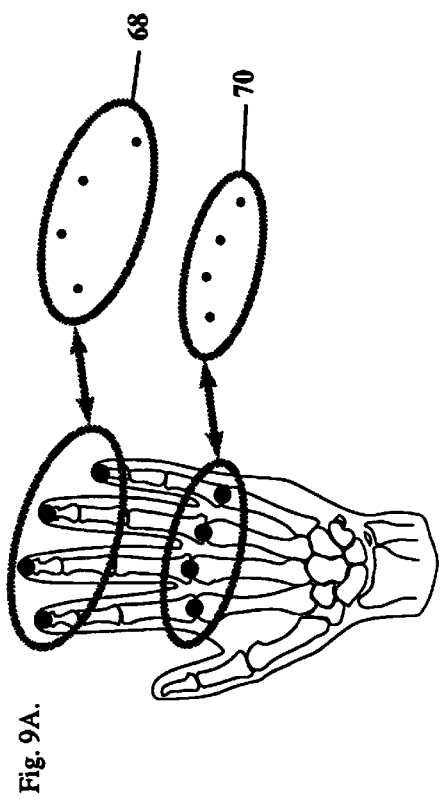
Fig. 9A.
Fig. 9B:
Fig. 9C:
Fig. 9D:
Fig. 9E:
Fig. 9F: DPT/MJ
DPT Data
MJ Data

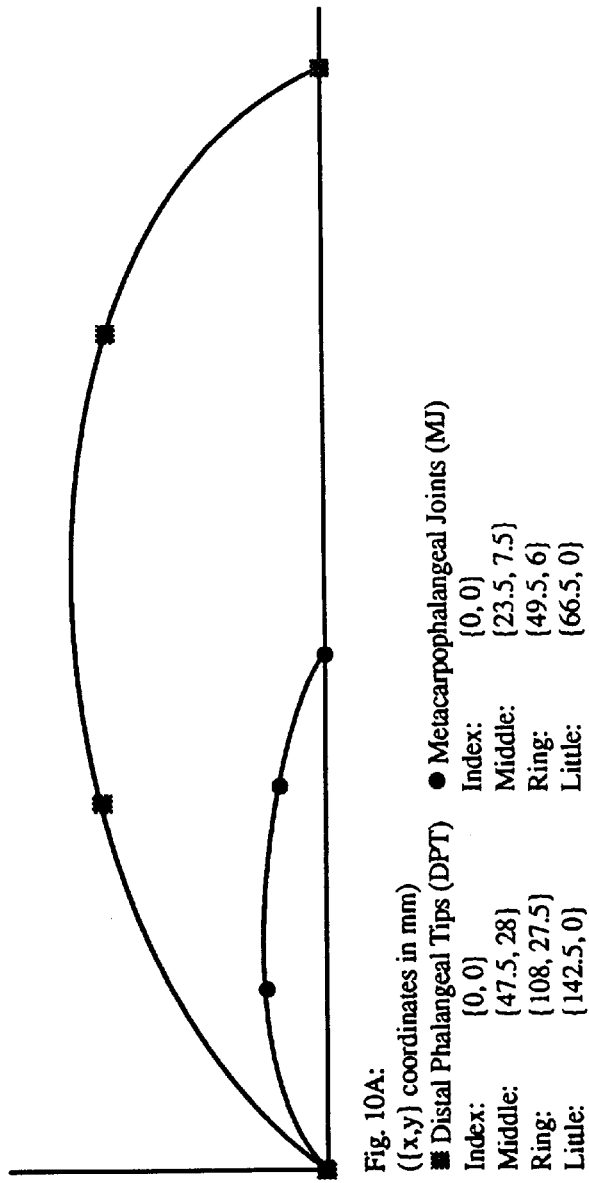
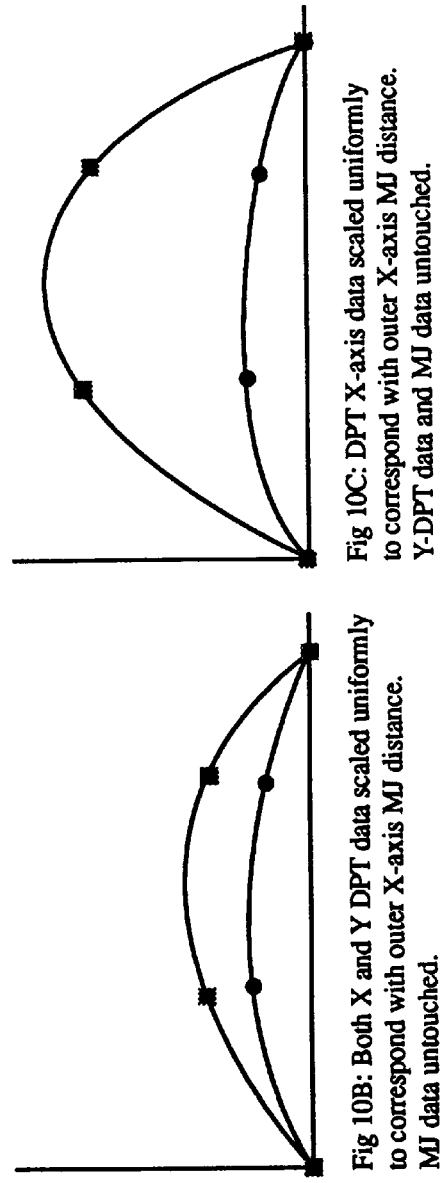
Fig. 10A:
((x,y) coordinates in mm)
■ Distal Phalangeal Tips (DPT)   ● Metacarpophalangeal Joints (MJ)
Index:  [0, 0]        Index:   [0, 0]
Middle: [47.5, 28]    Middle:  [23.5, 7.5]
Ring:   [108, 27.5]   Ring:    [49.5, 6]
Little: [142.5, 0]    Little:  [66.5, 0]
Fig 10B: Both X and Y DPT data scaled uniformly to correspond with outer X-axis MJ distance. MJ data untouched.
Fig 10C: DPT X-axis data scaled uniformly to correspond with outer X-axis MJ distance. Y-DPT data and MJ data untouched.

ERGONOMICALLY IMPROVED STANDARD KEYBOARD

BACKGROUND AND SUMMARY OF THE INVENTION

This is a continuation-in-part of U.S. patent application Ser. No. 08/047,633 filed Apr. 13, 1993 now U.S. Pat. No. 5,716,149, which was a continuation of U.S. patent application Ser. No. 07/780,935 filed Oct. 23, 1991 which is abandoned.

This invention relates to keyboards for computer input devices, typewriters, and other machines designed to make use of the manual input of linguistic and numerical information.

Heretofore, ergonomic improvements to keyboard design have taken an extremist approach, emphasizing one or another quality the designer felt was the essence of perfection in this field At first, this approach was an argument as to which of the basic adjustments was most important. Later, the idea of perfection evolved into the inclusion of every possible modification, the argument then being which combination of elements would achieve the "ultimate" ergonomic keyboard design.

From the beginning there have been numerous attempts to define just what particular ergonomic aspects were the most important. In general, this investigation revealed four main areas of concern, namely: character organization, curve, key grouping, and arm/hand alignment. The inclusion, approach, or combination of these concerns made up the underlying premise for each keyboard design, and identified it's weakness as well.

However, the marketplace is also an arbiter of design, especially in the area of keyboard development. In this field, virtually all keyboards in the marketplace consist of the same design, namely five parallel, horizontal rows with specific vertical key offsets, and the characters in the familiar "QWERTY" pattern. Though the character organization may differ, as in the alternative "Dvorak" arrangement (U.S. Pat. No. 2,040,248), the geometrical relationship between keys remains the same, constituting what can be generally referred to as the "standard keyboard". Despite all ergonomic influence and resultant designs, this standard keyboard makes up well over 99% of the keyboards in the world today.

For this reason, the development of a truly useful ergonomic keyboard must not only include the lessons of previous ergonomic developments, but must also include—and be tempered by—an understanding of the reasons behind the popularity of the standard keyboard. Without the incorporation of this understanding, any ergonomic development will inevitably become a mere theoretical study, as virtually all alternative designs have been to date, no matter how ergonomically perfect they claimed to have been. This is because psychological amenability is also a requirement of ergonomic design, and therefore must be respected. In the case of keyboards, this means ergonomic adjustment as a modification and improvement of the existing standard, rather than the creation of radically new designs which seek engineering perfection, but sabotage their efforts by ignoring the psychological fears of the user. The most ergonomic keyboard, therefore, is the one that is actually used.

Fortunately, the source of the popularity of the standard keyboard is not difficult to determine once a broader perspective than keyboard ergonomics is sought. The very nature of the devices keyboards have been attached to have usually been oriented towards serious work of one kind or another, and this fact is the foundation of the tenacious resistance people have shown towards change in keyboard design.

When people's livelihoods, or a business's profits, are directly connected with the design of a mechanism, there is usually great resistance to changing that which works, no matter how poorly it may accomplish it's function. Usually a combination of factors, including at the very least significant functional improvement and a favorable cost-benefit ratio, not to mention a significant increase in the pleasure of use, are required before any change is made in a vital piece of equipment. The more vital the equipment, the greater the resistance to change and the more prone to standardization, and the greater the benefit required before a new design can be accepted.

Keyboards have always been crucial to whatever their respective task has been. In typewriters, keyboards represented virtually the only way to get words into type, and the ability to do so in an efficient and accurate manner was the very livelihood of millions of people. In the case of computer input terminals this position of importance (and the number of people involved) was multiplied many times, for the universal applicability of computers meant that professionals of many more areas of concern were now also dependent for their livelihoods on the control of this new machine, control which they commanded solely through the use of a keyboard.

Therefore from the beginning the keyboard has filled a psychologically demanding role for those who have used it, and the sheer number of these users have made standardization virtually mandatory. Likewise, it is simply a matter of history that the standard keyboard with the QWERTY key arrangement was the earliest, and strongest, keyboard standard. As is explained many times in other patents and ergonomic studies, the QWERTY pattern of keys was actually designed to slow typists down so as to provide a typing speed amenable to the mechanical functioning of early typewriters, which jammed if used too rapidly. As is also explained in other patents, the geometry of the standard keyboard leaves much to be desired in the realm of typing physiology and ergonomics. Yet the solution of these patents has unanimously been to reject outright the standard keyboard in favor of more ergonomic designs, without understanding the reason for the massive psychological dependency already in place, against which any new keyboard design would ultimately have to compete. This blindness is the essence of the failure, in the most practical sense of actual use, of all of the ergonomic keyboards to date.

The four major areas of ergonomic modification as stated above render themselves difficult to incorporate into the standard keyboard geometry without effectively erasing that geometry. In past keyboard designs, each ergonomic topic, whether character organization, curve, key grouping, or arm/hand alignment, has been treated in a myopic and arbitrarily dependent fashion, since complete disassociation from the geometry of the standard keyboard was actually the goal of these designs. However, if the standard geometry is to be respected, these topics must be treated in a much more rigorous and unilaterally integrated way in order to fit into the narrow confines of the standard geometry. This precision of this rigor transforms the nature of each ergonomic topic into substantially new topics altogether, just as tolerance levels in any design process differentiate entire fields of endeavor even though those fields may share common origins. Especially relevant to this distinction is the determination of the exact aspects of the hands and arms which are most pertinent to keyboard ergonomics, while precisely integrating this data into a keyboard design which continues to maintain the geometry of the standard keyboard.

Physiological derivation of structure is inherently significant in ergonomic keyboard design, since subtle geometric changes, compounded by usage, render appreciable physiological influences affecting Repetitive Stress Injuries.

Physiological Considerations

The present invention uses a completely different set of reference points than those used by the prior art. Additionally, the curves resulting from these different reference points reside in entirely different curve families. Therefore these two curve geometries, as well as their dependent keyboard structures, are substantially different from one another. However, this difference goes beyond mathematics, for it can also be shown that there is a significant operational difference between these curve-dependent keyboard structures as well.

Ergonomic keyboard design is mainly a consideration of the long-term effects of keyboard usage on the fingers, hands, wrists, and arms of a typist. This is because long-term users derive great benefits in speed and ease of use by implementing the touch-typing system of keyboard operation. However, such a typing system requires a relatively fixed placement of the involved anatomy, a positional demand which serves to magnify any physiological stresses over time. On the other hand, short-term keyboard users can accommodate non-ergonomic keyboards much more easily, since they do not generally use a touch-typing method of operation, or if they do, it is not repeatedly used for long periods of time.

In order to make use of a touch-typing system, the relevant anatomy must be positioned in such a way that the simplest possible repetitive movements may be used to strike the keys, thus allowing the lowest possible energy use by the typist to operate the keyboard (whether in physical adjustment, coordination, or concentration). In this way, the resulting comfort, speed and accuracy of the typing process over a prolonged period of time are substantially enhanced.

Range-of-Motion

The ergonomic stresses of the typing process result from the demands and restrictions typing places on the natural motions of the human body. The physiological systems of the body work interdependently to adapt to operational demands. Much of the adaptive physiology relevant to the typing process derives from the motions of flexible, multi-jointed limb structures—in this case, the fingers, hands, wrists and arms. However, a multi-jointed physiology is only as strong as the health of the joint assemblies which comprise it. More pertinently, the same physiology is weakened by any limitation of the proper functioning of the joint assemblies involved. Therefore any restriction of the natural movements of the joints required in keyboard operations will exert negative stresses on the associated physiological systems.

Repetition

Further, since the impact of any stress is compounded by its repetition (such as those found in the touch-typing system), even minor stresses to joint physiologies can be compounded over time to create major, even crippling, disorders. This is exactly the scenario found in most keyboard-related injuries, such as Carpal Tunnel Syndrome, or CTS. In fact, the severity of these injuries are so dependent upon the repetitive process by which they develop that the general medical term for them is Repetitive Stress Injuries, or RSI, of which CTS is only one example.

RSI—Fixed Position of Limbs

RSI from keyboard operations is the result of two simultaneous processes. The first is the basic requirement of the touch-typing process for fixed operational limb positions. These fixed positions undermine the natural functioning of the involved physiology, because each joint has its own unique directional strengths and weaknesses, which are accessed and avoided, respectively, through the dynamic reorienting of the limbs as they are used in any given task. However in order to support faster keying, the fixed-position, repetitive-motion demands made on the anatomical structures involved in typing, and especially the touch-typing system, deny dynamic repositioning of the limbs to properly adjust to the task. Thus it can be seen that this fixed-limb positional requirement prevents a natural adaptive process from taking place, and thus creates the first of two sources of the negative physiological stresses resulting from keyboard operations.

RSI—Increased Sensitivity to Pain

The second half of the RSI problem is that, until the present invention, keyboards have not been designed to accommodate the increased level of ergonomic sensitivity created by the restricted limb positions they require for use. This failure to accommodate the artificially constrained range-of-motion capabilities of the restricted limbs has greatly exacerbated the RSI problem since the advent of electronic keyboards. When keyboards were limited to mechanical construction, each keypress required significant physical strength, and so necessitated considerable involvement of the upper limbs of the arms. Because of this, the typist was required to allow natural limb adaptation to a significant degree, for only by allowing such physiological orientation could the requisite strength be found to operate the keyboard over a prolonged period of time. As well, since each line required a break in the typing process to return the carriage, and each page required the insertion of a new sheet of paper, there were built-in, forced breaks from the repetitive stroking of the typing process. All of these impediments to the typing process cut down on the resulting speed of the operation, but supported the physiological heath of the typist by requiring the use of the entire multi-limbed system of the upper arm to adapt to the task. However, with the modern situation of electronic keyboards connected to computer terminals, these practical limitations have vanished, and with them any forced demands for the use of the arms in the typing operation.

"Significance" is Dependent upon Ergonomic Appropriateness

Therefore the current typical typing situation greatly supports the development of RSI in the typist, for the involved physiology is held unnaturally to accommodate the keystroking process while every technical requirement preventing the continued use of this innately harmful posture has been removed. The significance of any ergonomic accommodation of this dysfunctional posture is therefore found within an analysis of the distressed physiology itself, for only in relation to health do judgments about significance have any relevance in this art. In particular, significance is not found through the direct comparison of differing keyboard designs, a process necessary only to determine if the designs are, in fact, structurally different. To the contrary, significance in the present art is nothing other than physiological significance, according to the requirements and parameters of the involved physiology during the typing process. It must be stressed that this is not the result of determining the needs of a healthy physiology, but rather the needs of a physiology undergoing prolonged unnatural stress, a limitation of natural adaptive function, and an artificially heightened sensitivity to pain.

Analysis of Ergonomic Appropriateness

Accordingly, two major areas of unnatural physiological stress, dorsiflexion and radial or ulnar deviation, are particularly pertinent to this discussion. These terms refer to the directional planes of hand misalignment during the typing process. Dorsiflexion is the upward bending of the hand, so that the back of the hand in the typing position is rotated upwards from the carpus of the wrist. Radial or ulnar deviation is the planar rotation of the hand, again from the carpus of the wrist, either inward towards the radial bone of the forearm (on the same side as the thumb), or outward towards the ulnar bone of the forearm, again with the hand in the typing position.

These two general types of wrist flexion are the main adaptations still available to the involved physiology. As a result, they are grossly overused to accommodate for the many other types of joint-oriented adaptations which are denied by the demands of the modern typing process, such as those involving the multiple limbs and joints of the arms. In particular, it must be noted that the available adaptations are both carpus, or wrist-based, movements, by definition much grosser than those normally possible by the fingertips. However, by restricting the positions of the limbs and forcing the hands into a semi-curled position, the normal range of motion of the fingers is severely restricted, and they are unable to reach the keys of a normal keyboard without additional help. Given the noted restrictions, this help has only been available through the previously described actions of the carpus. In making these adjustments to support the needs for the fingers, however, the nerves, blood vessels and tissues which make up and pass through the carpus of the wrist are subjected to prolonged unnatural stress, aggravated by the repetitive impacts of typing, which finally surpasses their operational integrity and causes RSI of one kind or another (it is this carpal-oriented stress which is the source of the great number of CTS injuries today).

Subtlety is Ergonomically Appropriate

Yet the carpal deviations themselves are subtle, otherwise typing could not take place at all. In fact, they are so subtle that without the repetitive impacts of the typing process to aggravate the noted anatomical stress, most RSI would not take place. Therefore it is clear that the ergonomic requirements, and thus the estimation of significance, of the unique designs of the present art are also subtle. In particular, while it is impossible to eliminate key-striking from the typing process, alleviation of carpal misalignment proves to be highly significant, since it is this particular anatomical stress which is so greatly multiplied by the repetitive striking of the keys. Therefore the field of significance in the present art, which had been shown to be a consideration of physiological stress, is more specifically found to be a consideration of the nature and degree of the subtle carpal deviations forced upon the involved physiology to accommodate the demands of the typing process.

Subtlety is "Significant"

It is within this frame of reference that the subtle differences between the curve of the present invention and the curve of the prior art become highly significant. When the hand is curled in the normal typing position, the freedom of movement normally accorded the phalanges (fingers) is severely constrained. In particular, since the hands are held in a relatively fixed position above the keyboard, the fingers are limited in reach to the linear motions of the phalangeal joints. This is because while the base of the fingers, the metacarpophalangeal joints, normally have much broader ranges of motions, in this case these joints are relatively immobilized by the positions of the hands, wrists and arms in the typing position.

Therefore, the only way to accommodate even the slightest inability of the fingers to reach a key while maintaining this position is to deviate the carpus. And since the fingertips, when bent, do not describe the curve they form when straightened together (as in the curve of the prior art), a keyboard based on the finger length curve used by the prior art will not fit the reach of the fingertips in the typing position. In such a case, the carpus would then have to be deviated to enable the fingertips to reach the keys, just as would be necessary in the operation of a normal, non-ergonomically adjusted keyboard (though obviously, in such a case, in a different pattern of deviation to adjust to the different keyboard geometry pattern).

Only in the curve of the present invention are the needs of the fingertips in the typing position adequately addressed, by providing the keys in a curve which follows the operational constraints of the fingertips in the typing position, and thus requiring the absolute minimum of carpal deviation. It is this reduction in required carpal deviation which accords significance to the curve of the present invention, and simultaneously denies significance to the curve of the prior art. In fact by this discussion it may be seen that in their inability to accommodate the actual anatomical needs of the fingers in the typing position, the physiological effects of keyboards built upon the finger length curve are substantially equivalent to the effects of non-ergonomic keyboard structures, if not worse, and thus constitute a failure to teach as claimed.

The structure of the present invention has been shown to be based on the curve formed by metacarpophalangeal joints, which form the base of the fingers. Unlike the curve formed by the tips of the fingers, in over 100 years of ergonomic keyboard development the curve formed by the finger bases has never been used, nor even noted, in the art. In fact, nowhere in ergonomic biomechanical engineering is this curve identified for any reason. Only in the theory of the zero-point coordinate system, proposed for the first time in the specification of the present application, is the ergonomic significance of the metacarpophalangeal curve identified for any reason, and especially linked with the needs of ergonomic keyboard engineering.

The assumption of this system is that the brain seeks to minimize the energy needed to track the locations of the fingertips. Since the finger bases are the closest fixed point to each finger tip, they are presumed to be the reference point used by the brain to track the positions of the fingers in space. Accordingly, it follows that the curve formed by the fingertips align with the curve formed by the metacarpophalangeal joints when the fingers are relaxed, and thus zeroed in this reference system. Such a zeroing situation also occurs when the fingers are held in the typing position, since this position is identical with the positions of the fingertips in space when the forearms, wrists, hands and fingers are naturally relaxed. For these reasons, the curve formed by the finger bases is deemed by the present application to be of critical importance to ergonomic keyboard design, since it is seen to form the foundation of ergonomic keyboard structure.

The significance of the metacarpophalangeal curve is that it is not just based in anatomy, but is also a neurophysiological brain reference. Therefore, the positions of the fingertips in space when the hand is relaxed is not just the mandatory result of hand architecture, but also of the inclusion of a brain information storage strategy based on minimum energy use.

Therefore all of the ergonomic keyboard designs heretofore known suffer from a number of disadvantages:

(a) They ignore the fundamental importance of integrating standard keyboard geometry with ergonomic modification, and therefore make no effort to do so.

(b) They do not describe in either a neuro-physiologically or statistically viable fashion exactly which aspects of the hands may be measured to produce data pertinent to the integrated ergonomic adjustment of the keys of a standard keyboard.

(c) They do not describe in what fashion the keys of the standard keyboard may be safely adjusted without disrupting the geometry of the standard keyboard.

(d) They do not link the relative positions of the keys with the relative positions of the bases of the fingers operating those keys.

Accordingly, several objects and advantages of my invention are:

(a) To provide a keyboard which includes as a primary design requirement that all ergonomic keyboard modifications be integrated with an obvious and functional similarity to the geometry of the standard keyboard.

(b) To provide a keyboard which includes in it's design the incorporation of a new assumption of the neuro-physiology of the arms, hands and fingers of a typist which will enable the gathering of statistically precise data for the creation of an ergonomically improved standard keyboard.

(c) To provide a keyboard which incorporates an analytical methodology by which the keys of the standard keyboard may be grouped and moved according to a variety of ergonomic needs without disrupting the geometry of the standard keyboard.

(d) To provide a keyboard which links the relative positions of the keys with the relative positions of the bases of the fingers operating those keys.

Further objects and advantages of my invention will become apparent from a consideration of the drawings and the following description of them.

BRIEF DESCRIPTION OF THE DRAWINGS

For a detailed description of the preferred embodiment of the present invention, references should be made to the accompanying drawings wherein:

FIG. 5A shows the homekeys plotted for each hand according to relative fingerbase distances and average finger-separation widths.

FIG. 5B shows the homekey plots for each hand of FIG. 5A rotated inward according to the wrist-fingerbase angle.

FIG. 5C shows the plot of FIG. 5B with each keycap reoriented back to it's standard vertical position.

FIG. 5D shows the plot of FIG. 5C with key spacing at standard keyboard tolerances and additionally required homerow keys averaged into the plot.

FIG. 8A shows the skeleton of the human hand and wrist, and highlights the locations of the metacarpal bones.

FIG. 8B shows the skeleton of the human hand and wrist of FIG. 8A, and highlights the locations of the carpal bones.

FIG. 8C shows the skeleton of the human hand and wrist of FIG. 8A, and highlights the location of the carpo-metacarpal joints of the palm, showing them to be the juncture of the metacarpal and carpal bones within the body of the hand.

FIG. 8D shows the skeleton of the human hand and wrist of FIG. 8A, and highlights the Phalangeal bones of the fingers, and the Ulna and Radius of the Forearm.

FIG. 8E shows the skeleton of the human hand and wrist of FIG. 8A, and highlights the locations of the distal phalangeal tips (fingertips), the metacarpophalangeal joints (finger bases), and the radiocarpal (wrist) joint (also referred to herein as the line of the wrist).

FIGS. 9A–9D show a step-by-step illustration of the data analysis and transformations used in the present invention, as applied to both the distal phalangeal tip (fingertip) curve datapoints of the prior art and the metacarpophalangeal Joint (finger base) curve datapoints of the present invention, respectively.

FIG. 9E shows a Bezier curve fitted to each set of datapoints. The type of curve fitted to the datapoint set is optional, and determined by need. For comparison purposes, of course, identical curve functions must be applied to both data sets.

FIG. 9F shows the two plots of FIG. 9E superimposed upon one another, thus illustrating the relative differences between the two curves.

FIGS. 10A–10C show a comparison of actual datapoints taken from human hands superimposed upon one another as is illustrated in FIG. 9F, after having been transformed according to the process illustrated in FIGS. 9B–9E.

DETAILED DESCRIPTION OF THE INVENTION

Figure 1:
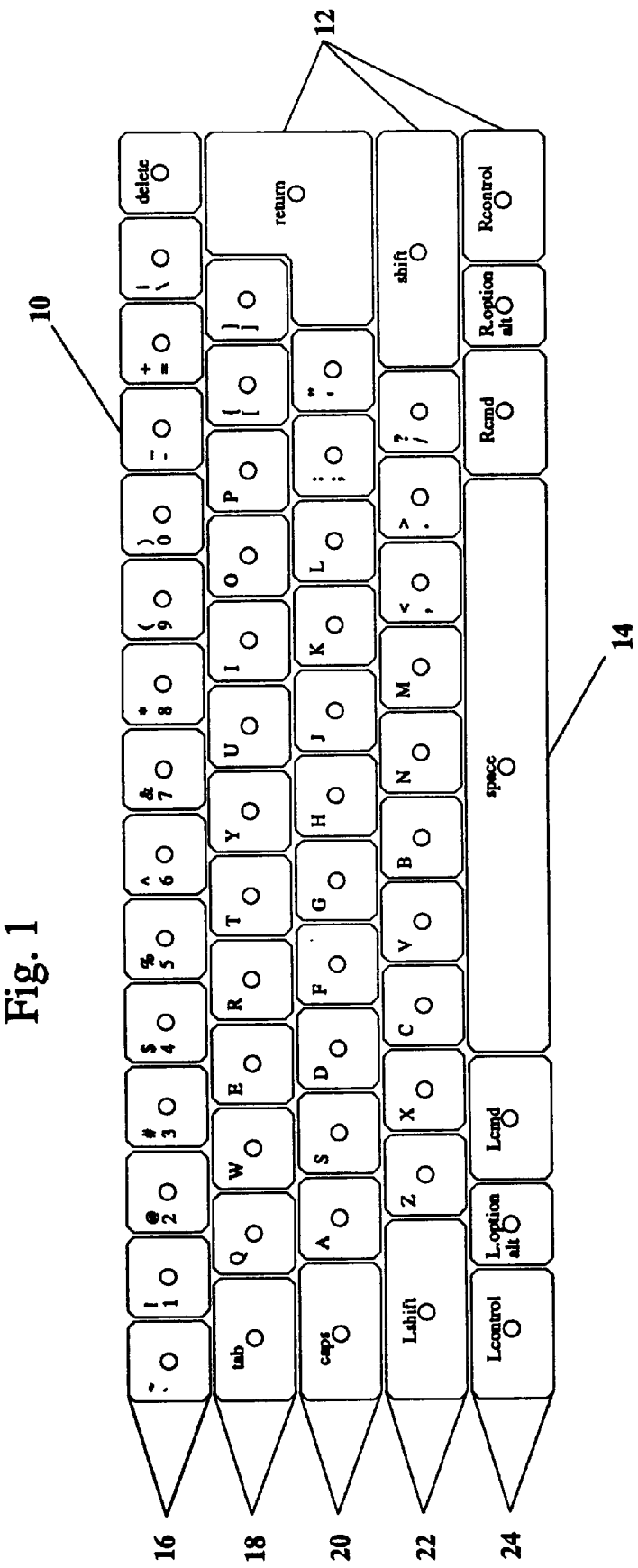
FIG. 1 shows an example of the full standard keyboard.

The improved keyboard is the result of specific modifications to a pre-existing keyboard. However, the modification of pre-existing keyboard designs (such as what is commonly referred to as the standard keyboard, a common variation of which is illustrated in FIG. 1) will likely be a large percentage of the applications of the present invention. Therefore this design modification will be used as the main applicational example of the technology described herein. For clarity, the generally accepted geometrical design of the standard keyboard will first be described in order to provide a foundation for understanding the geometry of the improved keyboard. And while the following ergonomic modifications are most likely to be applied to the standard keyboard, it must be noted that these ergonomic modifications may be applied to many other keyboard designs as well.

The keys 10 of the standard keyboard are generally identical in shape and size, except for the outer function and modifier keys 12 which are usually horizontally elongated in order to give the complete standard keyboard a generally rectangular appearance.

The standard keyboard generally consists of a main alphanumeric body of at least three, but usually five, parallel, horizontal rows of keys (FIG. 1). Each of the three middle rows 18, 20, 22 normally includes a sequence of alphabetical and grammatical characters (such as the QWERTY or Dvorak sequence), usually bordered on the end of each row by modifier or function keys of some sort. The lowest row of keys 24, positioned closest to the typist and immediately under the lower of the middle three main rows, is generally made up of modifier or function keys on either end of a long spacebar 14. The highest row of keys 16, positioned farthest from the user above the upper of the middle three main rows, is generally made up of numerical keys with modifier or function keys on either end of the row.

While the horizontal rows 16, 18, 20, 22, 24 of the standard keyboard are usually aligned without deviation, the vertical alignment of the keys are usually staggered, and it is this specific juxtaposition of horizontal and vertical key relationships which make up the geometry of the standard keyboard (FIG. 1). In particular, the reference for the vertical alignment shift is generally the home, or middle row 20. The row 22 immediately beneath the home row, generally the lower alphabetical row, is usually organized in such a way that the keys of this row have their midpoints oriented in vertical alignment with or near the space between the keys of the homerow 20. The row 18 immediately above the home row, generally the upper alphabetical row, is usually organized in such a way that the keys of this row have their midpoints oriented in vertical alignment with or near the left one-third vertical divider of the keys of the homerow 20. Finally, the row 16 immediately above the upper alphabetical row, which is the row above the homerow, is usually organized in such a way that the keys of this row have their midpoints oriented in vertical alignment with or near the space between the keys of the row 18 immediately beneath them.

This general key relationship is the essence of what is usually referred to as the standard keyboard geometry (FIG. 1). And while the specific organization of the alphanumeric characters assigned to the keys of such a keyboard may vary, this does not effect the geometrical description of the keyboard, or it's applicability to the modifications of the improved keyboard.

Figure 2:
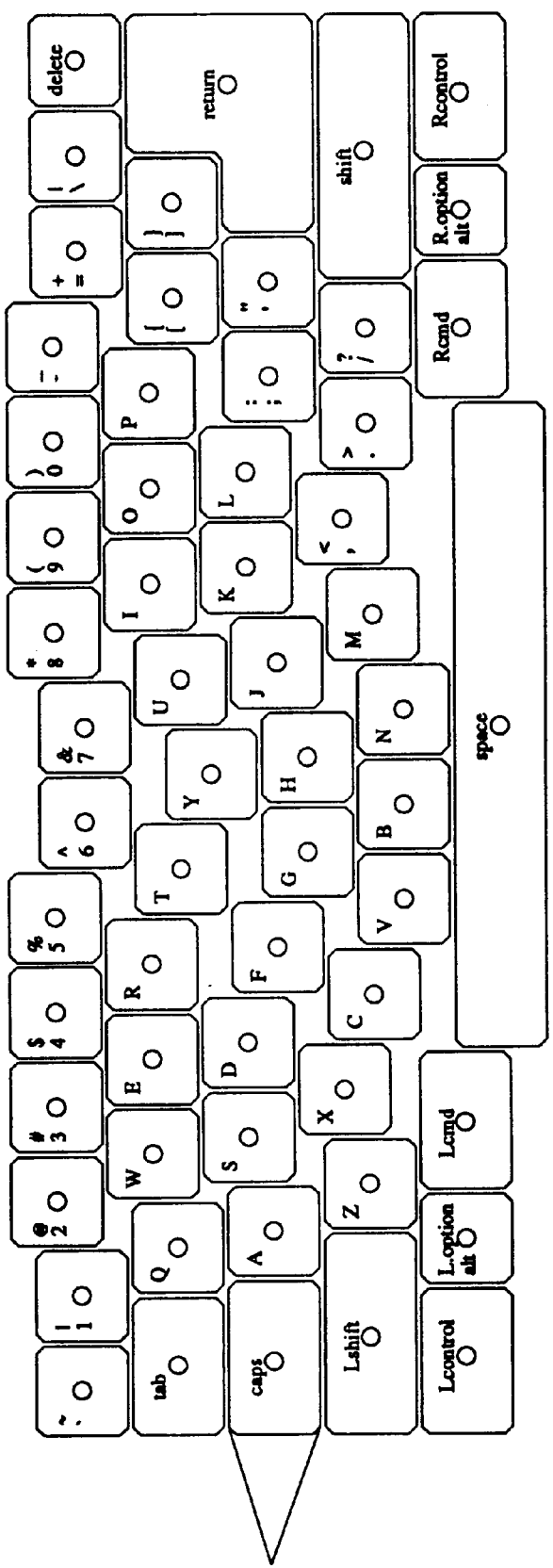
FIG. 2 shows an example of the full ergonomically improved keyboard.

The foundation of the improved keyboard, one variation of which is shown in FIG. 2, is the idea of preserving the geometrical relationships between the keys of the standard keyboard while repositioning of groups of keys into a more ergonomic arrangement. Such positioning can include the alignment of keys with an ergonomically adjusted homerow 26, and/or in a way more easily reached by their assigned fingers, and/or to fit the natural, relaxed typing position of the body.

It must be stressed that the requirement of respecting the innate key geometry of the standard keyboard (FIG. 1), or any original keyboard, puts limits on the degree of possible ergonomic adjustment; the improved keyboard is therefore not the most ergonomically perfect arrangement of keys, but rather that arrangement which incorporates the most ergonomic improvement while still preserving the general geometry of the standard keyboard.

The home keys are the traditional rests for the typing fingers, and as such play a fundamental role in any ergonomic keyboard improvement. It is vital the geometry of these keys be as accommodating as possible to the natural, relaxed position of the fingers in the rest typing position. Therefore the basis for appropriate ergonomic adjustment is the proper orientation of the home keys to a curve based on appropriate data, all other ergonomic adjustments being subsidiary to this one.

Anatomy and Physiology

Figure 4:
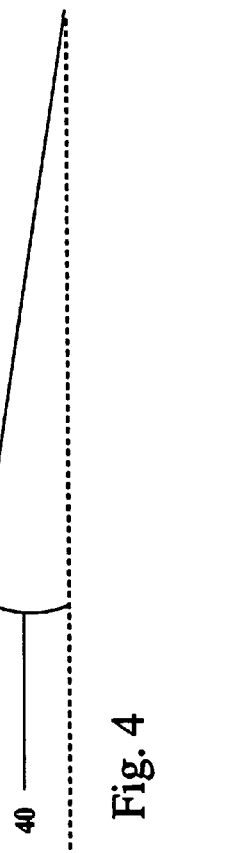
FIG. 4 shows how the angle between the wrist and the averaged fingerbase straight-line is measured.

Analysis of the anatomy and physiology of the human hand must start with the description of the architectural frame of reference. Accordingly, it is noted that the hand is found to be comprised of three main structural subgroups: the fingers, or phalanges 54 (FIG. 8D); the palm, or metacarpals 48 (FIG. 8A); and the wrist, or carpus 50 (FIG. 8B). The structures and interactions of these subgroups describe the abilities and restrictions of the hand, and thus supply the physiological information necessary to determine the ergonomics most relevant to keyboard design. These subgroups are not dependent on any external visual referent to uphold their internal geometries. Any such referent, such as the calculated line through the wrist 38, 56, 58, 60, 66 (FIGS. 4, 8D, 8E) cited elsewhere in the present invention, is merely a measuring technique, and in no way creates or modifies the geometries themselves. By detailed analysis of the structural and functional differences of these geometries, the physiological foundations of the prior art are conclusively differentiated from those of the present invention.

Each finger is united with the hand at the top of the palm. This juncture is called the metacarpophalangeal joint 64, since it is where the bones of the palm, or metacarpals 48, link with the base of the fingers, or phalanges 54. Though the structure of the individual metacarpal bones of the palm are similar in shape to the bones which comprise the phalanges, they are in fact named for their connection with the wrist, or carpus 50. This is because physiological analysis of the metacarpals of the palm has revealed them to possess close functional similarities with the carpus of the wrist, but significant functional differences with the phalanges of the fingers. In particular, the heads and shafts of the metacarpal bones are fixed firmly in place by the tissues of the hand, with their bases tightly bound by ligaments to the carpal bones 52. Because of this binding with the carpus and fixed position within the palm, the metacarpal bones are considered to be a functional extension of the carpus, and not the phalanges. In contrast, the independent phalanges 54 of the fingers have dramatically freer ranges-of-motion than allowed the metacarpal bones in the palm of the hand. This overall structural differentiation of hand sections supplies firmness, flexibility and strength to the wrist and palm, while also providing strong, independent bone-joint bases for each of the mobile fingers. Therefore even though the metacarpal bones of the palm most resemble the bones of the phalanges in their individual structures, because of their overwhelming functional similarities with the wrist they are often integrated with the carpus into a single unit of physiological consideration, linked at the fixed carpo-metacarpal joints 52 (FIG. 8C), clearly distinguishing their physiological category from that of the phalanges (fingers) 54.

The thumbs are unique in that, while they are comprised of a metacarpal bone (connected to the carpus by a carpometacarpal joint at the proximal end and metacarpophalangeal joint with connected phalangeal bones at the distal end, just like the rest of the digits (FIGS. 8C and 8D)), the metacarpal bone of the thumb is extremely mobile. This mobility stands in marked contrast to the rest of the metacarpal bones, which are tightly bound and virtually immobilized in the palm of the hand. Therefore the similarity of bone structure between the thumb and the rest of the fingers is inadequate for allowing equivalent physiological classification, since the differing ligament structures allow such radical movement in the thumb and restrict it in the rest of the hand. For this reason, the thumb is not generally seen to be part of the same functional substructure as the carpus, metacarpals and connected phalanges, and is therefore not included in the discussion of this art except in the most ancillary fashion.

Discerning this functional alignment of the metacarpal bones with the carpus is an extremely important point of consideration in the determination of which aspects of hand physiology are relevant to keyboard design. The finger length curve used by all of the prior art is in fact the curve formed by the tips of the phalanges when the hand is relaxed and flattened 62, 68 (FIGS. 8E and 9A), for only in this position may the relative lengths of the phalanges be accurately measured. The phalanges themselves consist of three phalanx bones per finger (two for the thumbs) which vary in length 62, and are organized end-to-end; taken together they comprise the length of the finger. However, the curve described by the distal tips of the phalanges 62, 68 is not the same as the curve described by the ends of the single-boned metacarpals at the metacarpophalangeal joints (comprising the metacarpophalangeal curve) 64, 70 (FIGS. 8E and 9A). In the present invention, it is this latter curve which is referred to as the finger base curve, and specifically distinguished from the finger length (or distal phalangeal tip) curve of the prior art.

Curve Measurement

It must also be noted that the curve formed by the tips of the fingers, though nominally of finger length, can be distorted by the mobility of the fingers themselves. Unless a reproducible protocol is developed to specify the positions of the fingers during or after measurement (FIGS. 9D and 10C), it is not possible to accurately regulate the curve formed by the differing spreads of the flattened fingers between different hands. However this is not a problem for the measurement of the finger base, or metacarpal, curve, since these bones are held with great stability by the tissues of the palm. Thus the metacarpal curve is not only easier to measure reliably, but also provides data which is less prone to statistical variation than that resulting from attempts to measure the lengths of the fingers. In short, the fingertips move, while the fingerbases (or metacarpal joints) do not. Therefore the curve formed by the fingertips (i.e. the finger length curve) is a variable curve, while the fingerbase curve is stable, and thus consistently measurable, at all times.

Finally, physiological analysis notwithstanding, a direct comparison of the measured plots of the two types of curves taken from actual hands, whether of the hands of one person or the hands of different people, clearly shows the significant differences between the two curves (given that a position protocol is used for the measurements of the fingers (FIG. 10A)). In general, the finger length (phalangeal) curve is more sharply sloped and covers a greater area than the finger base (metacarpophalangeal) curve, which is more gently sloped and covers a narrower area (FIG. 10E). These measurable differences, when combined with the above structural analysis, substantially and irrefutably differentiate the two curves from one another. In fact, they place them in completely different curve families, even when statistical means are resorted to in order to try and equate the two curves (FIG. 10B).

Hand Measurements

Since the wrist is the base of the hand and the link with the geometry of the arms, it can be used as the reference point required to measure the relative length of each finger's base position.

Hand references are precisely identified in the present invention through the use of medical anatomy terminology, and uniformly measured by using curves based on self-contained coordinates derived from physiologically distinct curve families.

The hand may be effectively measured by deriving curve families from curves based on self-contained coordinates. In such a case, the curve being measured is still the same, but the method by which it is measured is increased in accuracy and efficiency, with the additional benefit of not requiring a reference outside of the datapoints being measured. Just as prior-art patents referencing finger length have made use of statistical means to first describe, and then evaluate, the finger length curves of different people, so also does mathematics serve the data evaluation needs of the present invention. By first describing the internal geometrical relationship of each data set using a self-contained coordinate system (FIGS. 9A–F), the curves of both the prior art and the present invention may be measured extremely accurately with an identical process, thus enhancing both the relevancy and reliability of the resulting data. By then making use of the common mathematical concept of curve families to evaluate the curves so described (FIGS. 10 A–C), a definitive way to make significant and incontrovertible evaluations of hand measurements, despite statistical variations in data, may be understood.

A self-contained coordinate system can be applied in a simple and straightforward way to measure the points which describe the curves of both the present invention and the prior art. In the use of such a system, whether Cartesian or Polar based, no other anatomical referents besides the data points themselves are needed to derive mathematically rigorous, and thus directly comparable, descriptions of the curves being measured 68, 70 (FIG. 9A). To measure the angle and distance of each data point from a common origin point and axis line in such a self-contained system, a straightedge line is drawn to connect the first and last datapoints of the data series, whether of the finger bases as in the present invention, or of the finger-tips of the extended finger-lengths as in the prior art (FIG. 9B). By then using the first datapoint as the origin, and the drawn line as one of the axis, the distance and angle of each additional datapoint need only then be measured in reference to these coordinates in order to exactly define the data series for the curve under investigation (FIG. 9C). This approach to measurement keeps the entire coordinate system self-contained—that is, based entirely upon the datapoints themselves, without needing to make use of external references, such as the line of the wrist or other physiological referents.

The data resulting from this method is then fitted by mathematical means to best-fit curves (FIGS. 9D and 9E), which can then be directly compared with one another to determine their family relationships (FIG. 9F). Curves of the same family may be defined as having identical shapes when their sizes are also identical. Further, if the size of curves of the same family vary with one another, there will not be any disproportionate change in their shape. While the datapoints for any particular curve will statistically vary, the overall structure of the curve will not. Curve size is determined by the distance along the axis line between the first and last data points, as well as the total amount of area covered between the curve and the axis line. Curve shape may be described by many methods, the simplest of which is the comparison of the slope of curve-intersect lines traveling from the origin and extending fixed distances down the polar coordinate axis (FIG. 9C). More advanced mathematics may also be used to analyze the curves and compare them with each other, to the same effect.

Such mathematical evaluation of the curves under consideration distinctly distinguish their structures from one another. As well, comparison of the different underlying bone relationships involved explain the architectural reasons for the unique mathematical properties of each curve. In this way it may be seen that the curve of the present invention is not of the same family of the curve of the prior art, the two curves being markedly different in shape even if the their horizontal sizes are equated (FIG. 10C). Statistical manipulations of the data collected from the different hand sub-architectures in question (finger base v. finger length) also fail to derive a curve which matches that generated by the data taken from the opposing architecture (FIG. 10B). As these distinctions are fundamental differences in geometric form, the curves under consideration thus reside in different curve families, and are therefore simply not substantively equivalent.

Accordingly, the most natural and ergonomic position of the fingers in the typing position is proposed to correspond to the metacarpophalangeal, or characteristic, finger base curve, which is described by the relative relationships of the base of the fingers where they join the hand 28, 64. The brain is seen as using the base of the fingers as the zero-point of the coordinate axis it uses to identify the position of each finger in space. This theory is used to determine two separate ergonomic data-sets, which are then integrated to form a final determination of the precise natural positions of the fingers in the typing position for any statistically measurable population. The respective data for either hand is seen as interchangeable.

Figure 3:
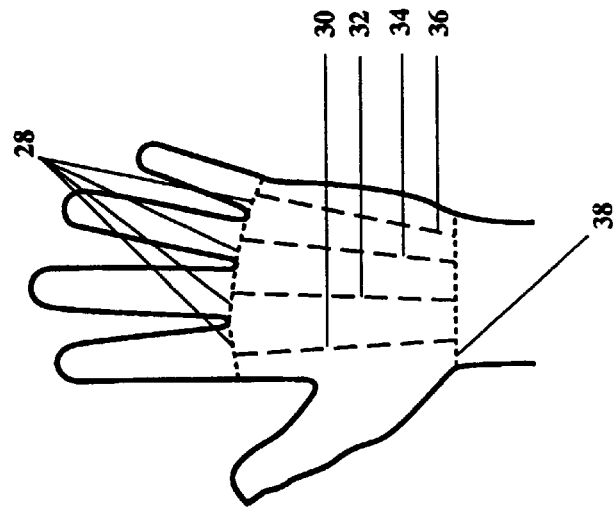
FIG. 3 shows how the distance between the wrist and the individual fingerbases are measured.

There are two general ways of extracting the same data for the finger base curve. In the first method, the first data-set (FIG. 3), which determines the relative positions of the naturally bent and relaxed fingertips, is seen to correspond to the relative measurements of the distances 30, 32, 34, 36 between the line of the wrist 38 and the base of each finger where it joins the hand 28, forming the characteristic finger base curve. This first data-set is theorized to closely approximate the exact positions in which the brain places the tips of each finger of a hand bent into the typing position. The second method, has been previously described and illustrated in FIG. 9C, and adds the advantage of not requiring the line of the wrist as a measurement reference, thus providing a self-contained coordinate system. Both of these measurement processes result in identical data sets, however the second is much easier to perform repetitiously and accurately upon the hand being measured.

The second data-set (FIG. 4), which determines the approximate angle required to bend the arms and bring the hands together over the keyboard, is seen to correspond to the relative angle 40 formed between the averaged straight line 42 drawn through the base of the fingers, and the line of the wrist 38. This second data-set is theorized to closely approximate the exact angle which the brain rotates the arms in order to bring the hands together in a natural, relaxed typing position.

Therefore the second data-set is used to adjust the data of the first data-set, integrating both into a close approximation of the locations of the fingertips when the hands are brought together in a natural and relaxed typing position over a keyboard.

The Ergonomic Modification of the Homerow—FIGS. 5A, 5B, 5C, 5D

Once the relative fingerbase measurements are used to create initial positions for the home keys in two major groups, one for each hand (FIG. 5A), two other modifications are generally necessary to complete the integration of ergonomic data into the homekey positions.

The first modification is the use of the characteristic finger base curve data to calculate the angle at which the homekeys of each hand need to be rotated inward as a major group (FIG. 5B) in order to accommodate the inward orientation of the arms when the hands are brought together over the keyboard. This angle is theorized to closely approximate the angle formed by comparing the line of the wrist with a best-fit straightedge drawn through a graph of the plot of the fingerbase data for each hand, as explained above. This enables the brain to make use of the above described data-points in it's orientation of the arms as well, minimizing the energy demands required to calculate the position of the arms, hands and fingers in space. Each keycap is then reoriented back to the vertical position (FIG. 5C) for alignment with the rest of the keyboard, though this step is modifiable, given the ergonomic demands of a given implementation.

The second modification is the extrapolation of the data describing the two major groups of keys to fit the non-rest keys of the homerow, and thus complete the homerow proper (FIG. 5D). This extrapolation may be done according to a variety of methods, including statistical calculation and the observation of the natural range of movement of the fingers from their rest positions.

Figure 6A:
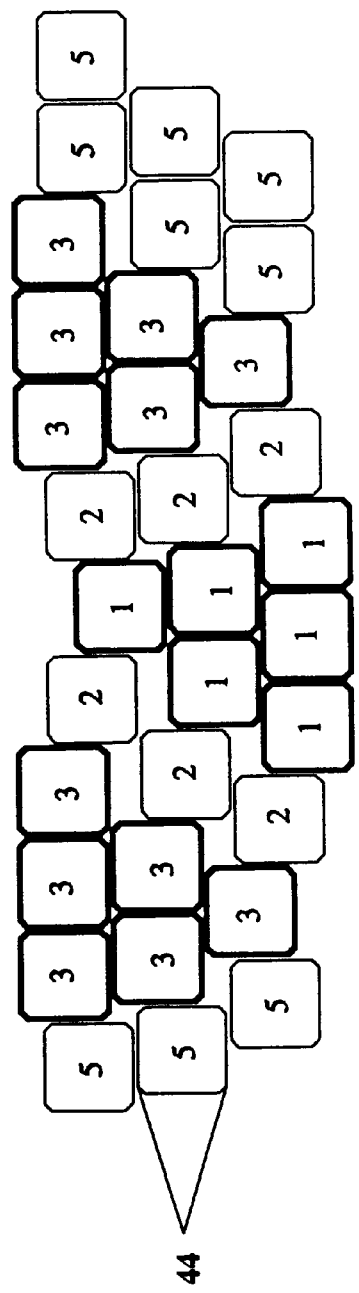
FIG. 6A shows homekey-based groups.
Figure 6C:
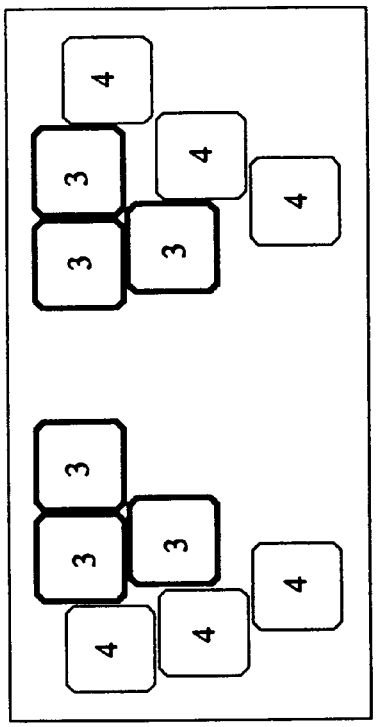
FIG. 6C shows the groups formed from group 3 of figure FIG. 9A when the inner homekeys are elevated.
Figure 6B:
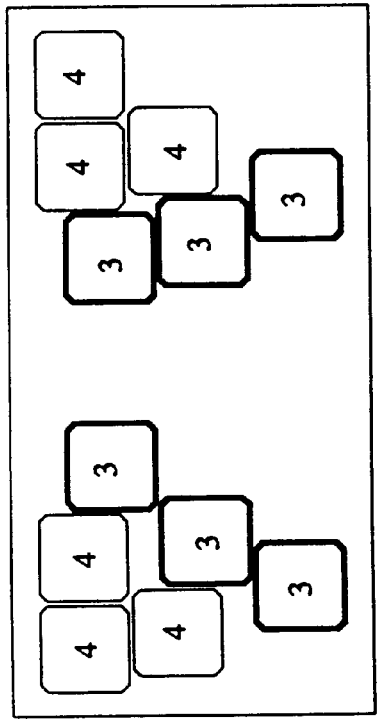
FIG. 6B shows the groups formed from group 3 of figure FIG. 9A when the outer homekeys are elevated.

Key Grouping—FIGS. 6A, 6B, 6C

After the proper modification of the homerow has been determined, whether by the above means or some other, respect for the geometry of the original keyboard (whether it be the described standard keyboard or some other) requires a method by which the keys of the keyboard can be ergonomically adjusted without destroying their basic geometry. It is this concern for the preservation of the key geometry of the original keyboard, which may also be coupled with the option of the above-specified homerow adjustment, which sets this particular ergonomic keyboard design apart from all others.

The method by which the original key geometry is preserved is the creation of logically minor key groups, within which the spatial geometry between the keys are unchanged from their original relationship. The ergonomic adjustment of the keyboard is thus derived from the re-adjustment of these groups, rather than the reorientation of individual keys. In this way the dual needs of original geometry preservation and ergonomic optimization are reconciled in the simplest possible way.

Accordingly, the minor groups are created in such a way as to approximate the closest-fit to the homekey finger-assignments while still approximating the ergonomic adjustment of the major groups of the homerow. This grouping is accomplished in three logical steps. First, the non-rest-position keys of the home row are considered home keys. Second, the keys assigned to each finger are logically grouped with their designated homekey forming the minor groups of keys. And third, the designated homekey of each group of keys is then ergonomically adjusted to it's new position within its major group, while keeping the geometry of the minor group intact. This keeps all of the keys within each minor group in their original geometrical relationships with each other and their assigned homekey. In this manner, the improved keyboard then becomes a new geometric placement of these homekey-based minor groups. An example of this, using the three main rows of the standard keyboard with the homerow 44 in the middle, is shown in FIG. 6A. In this illustration, each homekey-based minor group is distinguished by group-number.

This approach to logical minor key-grouping is modified only where it would lead to the placement of a non-homerow key directly interfering with the placement of either a homerow key, or a key placed previously in a way designed to avoid interference with the placement of a homerow key. In either case, the homerow key or the previously placed key would keep its position, and the non-homerow key of the group in question would be placed as closely as possible to the position ascribed to it by its standard keyboard finger-assignment, while still approximating the major group ergonomic adjustment of the homerow.

This type of interference is most common when the values of the homekeys are varied within their major group. Different major group key values create positional interferences. An example of this is illustrated in FIGS. 6B and 6C. In these examples, group number 3 is taken from FIG. 6A and readjusted so that the two homekeys are not of equal value within their major group. It can be seen from comparison that, depending on which of the two values is higher (the outer homekey in FIG. 6B, the inner homekey in FIG. 6C), different logical subgroups may result. This subgroup interference is possible between any minor group of keys, depending on their assigned major group values, and along with finger assignment, original keyboard geometry, and design intentions, determines the construction of the logical subgroups.

Figure 7:
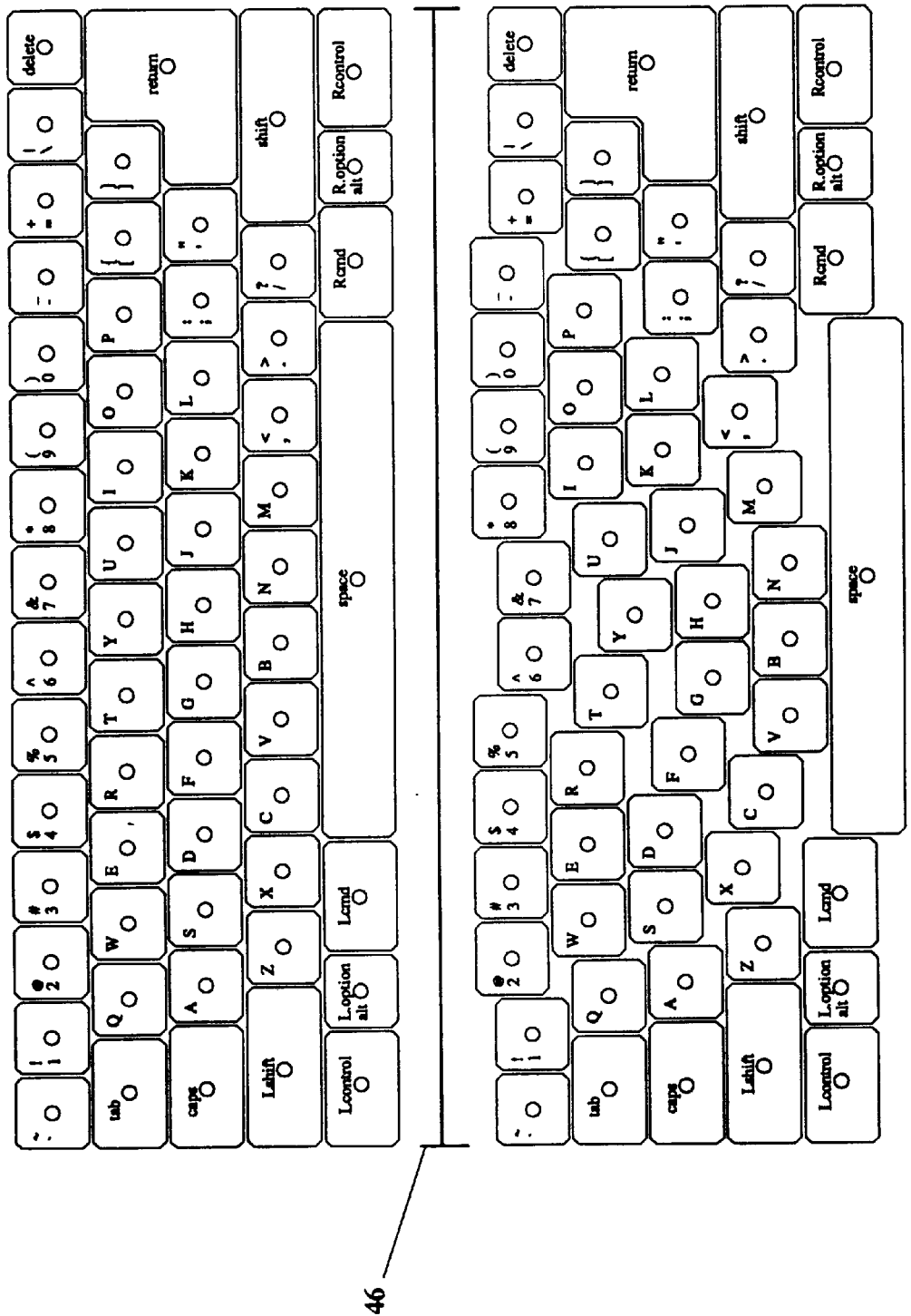
FIG. 7 shows the possibility of maintaining identical widths between the standard and ergonomically improved keyboards.

Adjustment Parameters—FIG. 7

The limiting of the placement of these key-groups is one of the distinguishing factors of this ergonomically improved keyboard Depending on the geometry of the original keyboard, whether it be the standard keyboard or some other which is to be so modified, there will exist naturally occurring limits to how far the ergonomic adjustments may be carried without violating the original keyboard geometry. These adjustment parameters are mainly determined by the nature of the original keyboard and the product development goals.

For example, to most closely follow the original geometry of the standard keyboard while still applying the full range of ergonomic adjustments described above, it is necessary to limit the possible range of group adjustments to vertical movements alone. In this way, very tight orientation with the original geometry is unavoidable, resulting in an ergonomically modified keyboard having no increased width 46 and minimally increased height, as in FIG. 7. Such a keyboard may be fitted virtually anywhere the standard keyboard is already in place. Other design requirements, such as the separation of hand groups or the addition of a third dimension of curve or depth, would imply their own adjustment parameters to the application of the above ergonomic modification methodology.

Conclusions, Ramifications and Scope of Invention

Thus the reader will see that the modifications described herein include the solutions to most of the ergonomic deficiencies of the standard keyboard, including limitations of psychological familiarization to existing norms, all in one simple, integrated approach. Furthermore, this ergonomically improved keyboard has the additional advantages in that

- it fits the natural finger, hand, wrist, arm, and posture positions of a typist;
- it can be easily altered to fit the needs of ergonomically different groups of people;
- it is simple to design and low-cost to build;
- it makes typing physically and psychologically safer and easier; and
- rising numbers of typing-related injuries make it evermore needed.

While my above description contains many specificities, these should not be construed as limitations on the scope of the invention, but rather as an exemplification of one preferred embodiment thereof. For example, different standard keyboard definitions can be similarly modified, groups can be made moveable and adjustable by the user, and a theory of typing bio-mechanics need not be used to determine the amount of homekey adjustment. Additionally, this invention may be applied to keyboards molded to curved surfaces, or using non-alphanumeric keys or designations, chording capabilities, single or multiple-hand designs, or miniaturization.

Accordingly, the scope of the invention should be determined not by the embodiments illustrated, but by the appended claims and their legal equivalents.

I claim:

1. A method of realigning the relative positions of keys of a standard keyboard comprising:

selecting a first set of points, each of said points being aligned along the metacarpophalangeal curve of the human hand of a user when said hand is in a first position, said set of points including points corresponding to a fingerbase of an index, middle, ring and little finger of the hand of said user, said points corresponding to said ring and little fingerbase being closer together than tips of said ring and little finger, said first position being one in which said hand is extending outwardly from a forearm of said user and said forearm is perpendicular to a longitudinal axis of said keyboard, and placing a centerpoint of a key directly beneath each of said plurality of points, each of said points being generally coincident with the location of a metacarpal joint at the base of the fingers of one hand of said user, and said keys located by said points defining a first set of keys, determining the amount of rotation required to bring said hand from said first position to a second position defined by rotation of said forearm about the user's elbow to a forearm position whereby said user's hands are adjacent to one another above said keyboard, rotating said first set of keys in unison by said amount corresponding to said rotation of said forearm, rotating each key of said first set of keys, without causing translation of said keys, so that lateral edges of said keys are extending substantially parallel to one another, and moving each of said keys of said first set of keys laterally toward one another to form a first set of laterally adjacent keys.

2. A method in accordance with claim 1 further comprising:

forming a second set of laterally adjacent keys which is a mirror image of said first set, placing said second set of keys symmetrically opposite said first set about a centerline of said keyboard, said keys in said first and second sets forming rest keys, said rest keys being eight in number and having designations which correspond to rest keys of standard keyboard upon which a users fingers rest, forming a homerow of keys, said homerow including said rest keys and two additional homerow keys between said first and second sets on each side of said centerline, forming groups of keys, each group having non-homerow keys and one homerow key, the non-homerow keys of a group corresponding to and being reachable from a rest key by a user's finger resting on such rest key, positioning the non-homerow keys of a group with respect to the rest key for such group in a manner which substantially corresponds to the relative positions of the keys on a standard keyboard reachable from the corresponding rest key of a standard keyboard.

3. A method in accordance with claim 2 further comprising:

resolving position interferences by assigning values to said non-homerow keys, and assigning positions for said non-homerow keys in an order based on values of said non-homerow keys, whereby, when an interference between keys arises, priority is given first to any homerow key, and as between any two non-homerow keys, priority is given to the key of higher value, and a key of lower value is moved to a position which is as close as possible to the position said lower valued key would have had if the interference had not arisen, while maintaining all of said keys in substantially rectilinear alignment whereby sides of said keys are generally parallel to one another.

4. A keyboard with keys arranged in accordance with the method of claim 1.

5. A keyboard with keys arranged in accordance with the method of claim 2.

6. A keyboard with keys arranged in accordance with the method of claim 3.

7. A keyboard having a plurality of keys and a laterally extending spacebar, said keyboard comprising at least one set of homerow keys, the centerpoints of said homerow keys being arranged in a first pattern based upon the metacarpophalangeal curve of the hand of a operator of said keyboard, said homerow keys having substantially straight lateral edges, said homerow keys being arranged in said first pattern in accordance with the following steps:

selecting a first set of points, said set of points including points corresponding to a fingerbase of an index, middle, ring and little finger of the hand of said user, said points corresponding to said ring and little fingerbase being closer together than tips of said ring and little finger, each of said points being aligned along the metacarpophalangeal curve of said operator, when said hand is in a first position, said first position being one in which said hand is extending outwardly from a forearm of said user and said forearm is perpendicular to a longitudinal axis of said keyboard, and placing a centerpoint of a homerow key directly beneath each of said plurality of points, each of said points being generally coincident with the location of a metacarpal joint at the base of the fingers of one hand of said user, and said homerow keys located by said points defining a first set of homerow keys, determining the amount of rotation required to bring said hand from said first position to a second position defined by rotation of said forearm about the user's elbow to a forearm position whereby said user's hands are adjacent to one another above said keyboard, rotating said first set of homerow keys in unison by said amount corresponding to said rotation of said forearm, rotating each homerow key of said first set of homerow keys, without causing translation of said homerow keys, so that lateral edges of said homerow keys are extending substantially parallel to one another, and moving each of said homerow keys of said first set laterally toward one another to form a first set of laterally adjacent homerow keys, disposing non-homerow keys adjacent to said homerow keys, centerpoints of each of said homerow keys and centerpoints of the non-homerow keys adjacent thereto forming lines which are not perpendicular to said spacebar.

8. A keyboard in accordance with claim 7 wherein:

said keys in said first and second sets are symmetrical about a transverse centerline of said keyboard, said first an second sets forming at least a portion of a homerow of keys, and said keys in said homerow comprising rest keys.

9. A keyboard in accordance with claim 8 wherein:

said keyboard includes a spacebar extending longitudinally along a portion of said keyboard generally perpendicular to said transverse centerline, and said first and second sets each containing four rest keys and two additional homerow keys, one additional homerow key for each of said first and second sets, each of said additional homerow keys being positioned adjacent to and toward said spacebar adjacent to an innermost one of said rest keys in its respective set.

10. A keyboard in accordance with claim 9 wherein:

said keyboard contains keys which correspond in designation to a standard keyboard, and groups of non-homerow keys around each of said rest keys, the non-homerow keys of a group being keys not in said homerow and being reachable by a finger resting on the rest key of said group, each of the non-homerow keys in a group being positioned relative to its corresponding rest key in a pattern which corresponds to its position on a standard keyboard relative to the key of said standard keyboard which corresponds to said rest key, except where one or more of said non-homerow keys of a group interferes with keys of another group or with a homerow key.

* * * * *